(12) United States Patent
Omori

(10) Patent No.: US 6,694,018 B1
(45) Date of Patent: Feb. 17, 2004

(54) ECHO CANCELING APPARATUS AND METHOD, AND VOICE REPRODUCING APPARATUS

(75) Inventor: Shiro Omori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/422,249

(22) Filed: Oct. 21, 1999

(30) Foreign Application Priority Data

Oct. 26, 1998 (JP) ............................................ 10-304303
Jan. 13, 1999 (JP) ............................................ 11-007004

(51) Int. Cl.[7] ................................................. H04M 9/08
(52) U.S. Cl. ............................ 379/406.03; 379/388.02; 704/500
(58) Field of Search ...................... 379/388.01, 388.07, 379/390.02, 406.01, 406.03, 406.06, 406.08; 381/66, 94.4; 704/500; 375/240, 241

(56) References Cited

U.S. PATENT DOCUMENTS 5,455,888 A * 10/1995 Iyengar et al. ............... 704/203
6,421,377 B1 * 7/2002 Langberg et al. ........ 379/406.01

* cited by examiner

Primary Examiner—Minsun Oh Harvey
Assistant Examiner—Daniel Swerdlow
(74) Attorney, Agent, or Firm—Jay H. Maioli

(57) ABSTRACT

An echo canceller is provided in which a down-sampling circuit converts a 16-kHz sampling frequency of a wide-band voice signal output to an 8-kHz sampling frequency of a narrow-band voice signal supplied at an input terminal, an adaptive filter estimates, from the wide-band voice signal whose sampling frequency has been down-sampled to 8 kHz in the down-sampling circuit, an echo signal coming from a speaker to a microphone and having an echo path characteristic imparted to the echo signal by an echo path filter, and a subtraction circuit subtracts from the microphone input signal the echo signal having been estimated by the adaptive filter.

13 Claims, 7 Drawing Sheets

ECHO CANCELING APPARATUS AND METHOD, AND VOICE REPRODUCING APPARATUS

BACKGROUND OF THE INVENTION

1. Field of the Invention

The present invention relates to an apparatus for, and a method of, canceling, when there are present an input voice signal supplied through a microphone and which has a first sampling frequency and an output voice signal provided from a speaker and which has a second sampling frequency, an echo component developed based on the speaker output voice signal, from the microphone input voice signal, and also to a voice reproducing apparatus using the echo canceling apparatus and method.

2. Description of the Related Art

The voice-frequency terminals such as a portable telephone incur an echo problem that a sound coming from a speaker of the terminal to a microphone causes an echo which will disturb the user in listening to the voice from the speaker. To solve this problem, there has been proposed an echo canceller adapted to estimate the frequency characteristic of an echo path by an adaptive filter and subtract the estinated echo signal from the microphone input signal. The echo canceller is supplied with two signals, one being an input voice signal supplied from a microphone and subjected to analog/digital (A/D) conversion (will be referred to as "microphone input signal" hereinafter) and the other being the A/D converted signal which is subjected to digital/analog (D/A) conversion for supply to a speaker (will be referred to as "speaker output signal" hereinafter), and thus the echo canceller outputs a voice from which an echo has been canceled.

On the other hand, there has been proposed a band widening technique for estimating an out-of-band component from a narrow-band signal whose sampling frequency is about 8 kHz and voice frequency is about 300 to 3,400 Hz, and synthesizing a wide-band signal whose sampling frequency is about 16 kHz and voice frequency is about 300 to 6,000 Hz.

However, no echo canceling technique has been established for a system which provides an output signal produced from a microphone input signal of 8 kHz in sampling frequency and whose sampling frequency is higher due to band widening and voice frequency band is also wide. This is because to cancel an echo, it is necessary to subtract, from a microphone input signal, of an echo signal which is estimated to come from a speaker and a sampling signal of the speaker input signal has to be equalized to that of the microphone output signal for the purpose of the subtraction.

OBJECT AND SUMMARY OF THE PRESENT INVENTION

Accordingly, the present invention has an object to overcome the above-mentioned drawbacks of the prior art by providing an echo canceling apparatus and method capable of canceling an echo component from a microphone input signal even if the latter is different in sampling rate from a speaker output signal.

The present invention has another object to provide a voice reproducing apparatus capable of canceling an echo component from an microphone input signal even if the latter is different in sampling rate from a speaker output signal.

The above object can be attained by providing an echo canceling apparatus adapted to cancel, from a microphone input voice signal having a first sampling frequency, an echo component developed based on a speaker output voice signal having a second sampling frequency, the echo canceling apparatus comprising according to the present invention:

means for converting the second sampling frequency of the speaker output voice signal to the first sampling frequency of the microphone input voice signal;

means for estimating an echo signal coming from the speaker to the microphone, based on the speaker output voice signal whose sampling frequency has been converted by the sampling frequency converting means; and means for subtracting from the microphone input voice signal the echo signal having been estimated by the echo estimating means.

The above echo canceling apparatus further comprises means for limiting the frequency band of the speaker output voice signal to within a range of frequency band of the microphone input voice signal, wherein the sampling frequency converting means converts the sampling frequency of the speaker output signal having been limited in band by the frequency band limiting means to the first sampling frequency, the echo estimating means estimates the echo signal based on the speaker output voice signal whose sampling frequency has been converted, and the subtracting means subtracts the estimated echo signal from the microphone input voice signal.

Also, when the first sampling frequency of the microphone input voice signal is 1/n (n is an integer) of the second sampling frequency of the speaker output voice signal, the sampling frequency converting means decimates the speaker output voice signal to 1/n in amount.

Also, the echo canceling apparatus cancels an echo developed in a voice reproducing apparatus adapted to increase the frequency bandwidth of a narrow-band voice signal supplied thereto and thus output a wide-band voice signal, and the subtracting means subtracts, from the microphone input voice signal, the estimated echo signal having been estimated by the echo estimating means based on the wide-band voice signal of which the sampling frequency has been converted by the sampling frequency converting means.

Also the above object can be attained by providing an echo canceling apparatus adapted to cancel, when an input voice signal of a first sampling frequency entered from a microphone is converted to an output voice signal of a second sampling frequency which is to be pronounced from an speaker, an echo signal developed based on the speaker output voice signal from the microphone input voice signal of the first sampling frequency, the apparatus comprising according to the present invention:

means for estimating an echo component coming from the speaker to the microphone based on a signal having a frequency equal to the first sampling frequency and which is not to be outputted; and means for subtracting, from the microphone input voice signal, the echo component having been estimated by the echo estimating means.

Also the above object can be attained by providing an echo canceling apparatus adapted to cancel, from a microphone input voice signal of a first sampling frequency, an echo component developed based on a speaker output voice signal of a second sampling frequency, the apparatus comprising according to the present invention:

means for converting the sampling frequency of the microphone input voice signal to the second sampling frequency; and means for estimating an echo signal coming from the speaker to the microphone based on the output voice signal; and means for subtracting the echo signal having been estimated by the echo estimating means from the microphone input voice signal whose frequency has been converted by the frequency converting means.

The above object can be attained by providing an echo canceling method adapted to cancel, from a microphone input voice signal having a first sampling frequency, an echo component developed based on a speaker output voice signal having a second sampling frequency, the method comprising, according to the present invention, the steps of:

converting the second sampling frequency of the speaker output voice signal to the first sampling frequency of the microphone input voice signal;

estimating an echo signal coming from the speaker to the microphone based on the speaker output voice signal whose sampling frequency has been converted by the sampling frequency converting means; and subtracting from the microphone input voice signal the echo signal having been estimated by the echo estimating means.

The above echo canceling method further comprises the steps of limiting the frequency band of the speaker output voice signal to within a range of frequency band of the microphone input voice signal; converting the sampling frequency of the speaker output signal having been limited in band by the frequency band limiting means to the first sampling frequency; and subtracting from the microphone input voice signal an echo signal having been estimated based on the converted output.

Also, when the first sampling frequency of the microphone input voice signal is 1/n (n is an integer) of the second sampling frequency of the speaker output voice signal, the sampling frequency is converted by decimating the speaker output voice signal to 1/n in amount.

Also, the echo canceling method cancels an echo developed in a voice reproducing apparatus adapted to increase the frequency bandwidth of a narrow-band voice signal supplied thereto and thus output a wide-band voice signal, and subtracts, from the microphone input voice signal, the estimated echo signal having been estinated by the echo estimating means based on the wide-band voice signal whose sampling frequency has been converted.

Also the above object can be attained by providing an echo canceling method adapted to cancel, when an input voice signal of a first sampling frequency entered from a microphone is converted to an output voice signal of a second sampling frequency which is to be pronounced from an speaker, an echo signal developed based on the speaker output voice signal from the microphone input voice signal of the first sampling frequency, the method comprising, according to the present invention, the steps of:

estimating an echo component coming from the speaker to the microphone based on a signal having a frequency equal to the first sampling frequency and which is not to be outputted; and subtracting, from the microphone input voice signal, the echo component having been estimated by the echo estimating means.

Also the above object can be attained by providing an echo canceling method adapted to cancel, from a microphone input voice signal of a first sampling frequency, an echo component developed based on a speaker output voice signal of a second sampling frequency, the method comprising, according to the present invention, the steps of:

converting the sampling frequency of the microphone input voice signal to the second sampling frequency; and estimating an echo signal coming from the speaker to the microphone based on the output voice signal; and subtracting the echo signal having been estimated by the echo estimating means from the microphone input voice signal whose frequency has been converted by the frequency converting means.

Also the above object can be attained by providing a voice reproducing apparatus adapted to convert an input voice signal of a first sampling frequency to an output voice signal of a second sampling frequency and pronounce the output voice signal while processing the input voice signal of the first sampling frequency picked up by a microphone, the apparatus comprising according to the present invention:

means for converting the second sampling frequency of the output voice signal to the first sampling frequency of the microphone input voice signal;

means for estimating an echo component coming from the speaker to the microphone based on the output voice signal whose sampling frequency has been converted by the sampling frequency converting means; and means for subtracting from the microphone input voice signal the echo component having been estimated by the echo estimating means.

Also the above object can be attained by providing a voice reproducing apparatus adapted to convert an input voice signal of a first sampling frequency to an output voice signal of a second sampling frequency and pronounce the output voice signal while processing the input voice signal of the first sampling frequency picked up by a microphone, the apparatus comprising according to the present invention:

means for estimating an echo component coming from the speaker to the microphone based on a signal having a frequency equal to the first sampling frequency and which is not to be outputted; and means for subtracting from the microphone input voice signal the echo component having been estimated by the echo estimating means.

Also the object can be attained by providing a voice reproducing apparatus adapted to convert an input voice signal of a first sampling frequency to an output voice signal of a second sampling frequency and pronounce the output voice signal while processing the input voice signal of the first sampling frequency picked up by a microphone, the voice reproducing apparatus comprising according to the present invention:

means for converting the frequency of the microphone input voice signal to the second sampling frequency;

means for estimating an echo component coming from the speaker to the microphone based on the output voice signal;

means for subtracting the echo component having been estimated by the echo estimating means from the microphone input voice signal whose frequency has been converted by the frequency converting means.

According to the present invention, the sampling frequency of the speaker output is converted to that of the microphone input, thereby permitting to use the conventional echo canceller in the present invention.

In this method of sampling frequency conversion, when lowering the sampling, the sampling frequency is downsampled. Also, the down-sampling may be done after limiting the band of the sampling frequency. Moreover, when the sampling rate is an integral multiple, the microphone input signal may be simply decimated for conversion of the sampling frequency. When the sampling rate is other than an integral multiple, a linear interpolation filter may be used without band limitation.

Also, an intermediate output equal in sampling rate to the microphone input, not the speaker output signal, is used, the sampling frequency is converted to that of the microphone input. In this method, a narrow-band frequency signal equal in sampling frequency to the microphone input is used in the band spreading.

On the contrary, the sampling frequency the speaker output may be converted to the sampling frequency of the microphone input, thereby permitting to use an echo canceller. In this case, up-sampling will be done. By any of the above-mentioned methods, echo can be canceled.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
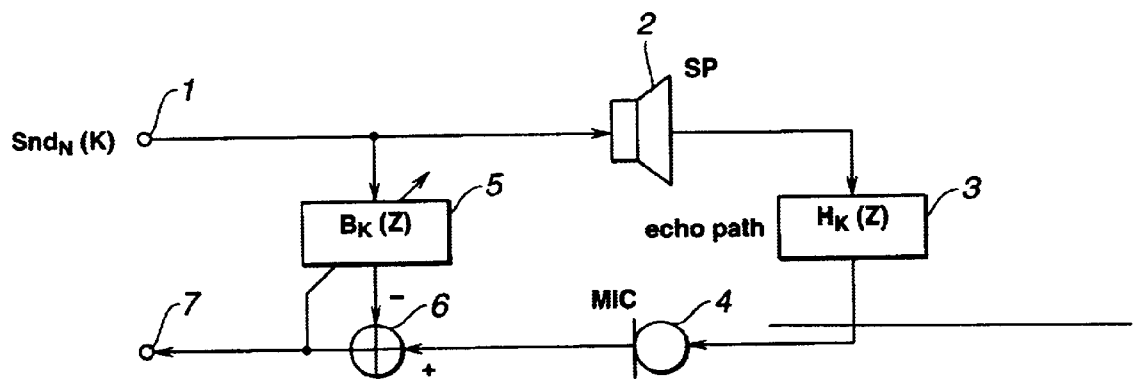
FIG. 1 is a schematic block diagram of a conventional echo canceller in which microphone input and output are equal in sampling frequency (8 kHz, for example) to each other.

An echo canceller is well known in which the microphone input voice signal and speaker output voice signal are equal in sampling frequency (8 kHz, for example) to each other. The basis configuration of the echo canceller according to the present invention is schematically illustrated in the form of a block diagram in FIG. 1. As shown, the echo canceller comprises an input terminal 1, speaker 2, echo path impulse response structure filter 3, microphone 4, adaptive filter 5, subtractor 6 and an output terminal 7. In this embodiment of echo canceller according to the present invention, echo path characteristic estimation to be done by the echo path impulse response structure filter 3 in the conventional echo canceller is effected by the adaptive filter 5. An echo signal estimated by the adaptive filter 5 is subtracted by the subtractor 6 from the microphone input signal from the microphone 4. The adaptive filter 5 has an initial value of a tap factor B (z) that is given as a constant. When an input to the microphone 4 is equal in sampling frequency to an output from the speaker 2, the tap factor B (z) is updated while a signal having the same sampling frequency and from which the echo signal has been canceled can be produced and delivered at an output terminal 7.

When a frequency band has been spread, however, since the microphone input is different in sampling frequency from the speaker output, the echo canceller cannot be used as it is. By converting the sampling frequency so that the microphone input and speaker output are equal to each other, the echo canceller can be used as it is.

Figure 2:
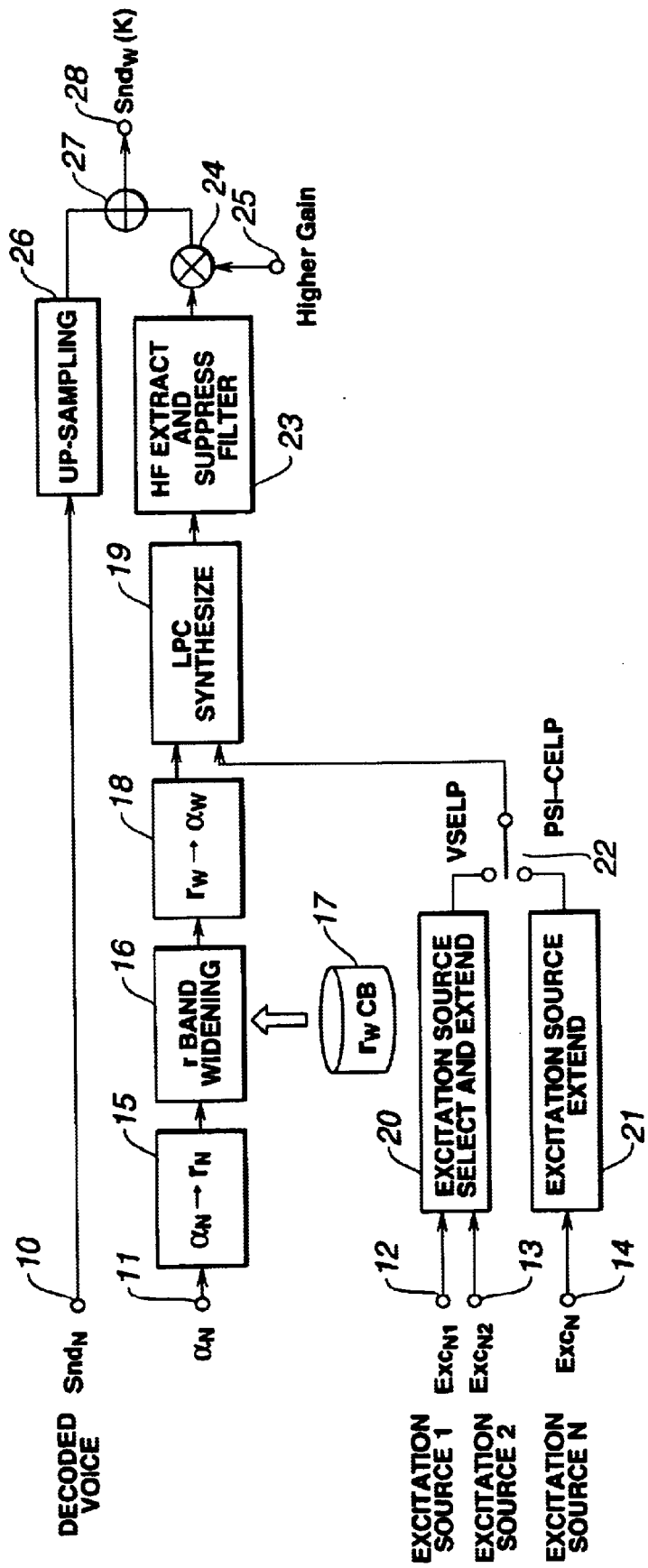
FIG. 2 is a schematic block diagram of a voice frequency band spreader to which the present invention is applicable and which needs the echo canceller.

Referring here to FIG. 2, there is illustrated in the form of a schematic block diagram a voice frequency band spreader to which the present invention is applicable and which needs the aforementioned echo canceller. In this voice frequency band spreader, PSI-CELP (pitch synchronous innovation-CELP) or VSELP (vector sum excited linear prediction), which is one of the personal digital cellular (PDC) codecs (short for coder/decoder), providing a sampling frequency fs of 8 kHz and a voice frequency band of 300 to 3,400 Hz, is spread in frequency band to provide a sampling frequency fs of 16 kHz and voice frequency band of 300 to 6,000 Hz.

The voice frequency band spreader is intended to spread the bandwidth of a voice based on coded parameters sent from a voice encoder in the transmitter section of a digital portable telephone, for example.

The coded parameters have been decoded by a voice frequency decoder provided upstream of the voice frequency band spreader. In case the voice encoder in the transmitter section of the digital portable telephone adopts the PSI-CELP method to code the voice, the coded voice will be decoded also by the PSI-CELP method in a voice decoder provided upstream of the voice frequency band spreader. If the voice encoder adopts the VSELP method to decode the voice, the code voice will be decoded also by the VSELP method in the voice decoder.

A excitation source-related parameter $Exc_{N1}$, $Exc_{N2}$ or $Exc_N$ being a first coded parameter included in the coded parameters and having been decoded by the voice decoder provided upstream of the voice frequency band spreader, is supplied from an input terminal 12, 13 or 14 to an excitation source selection and extension circuit 20 or excitation source extension circuit 21. Either an excitation source extension output from the excitation source selection and extension circuit 20 or a one from the excitation source extension circuit 21 is selected by a switch 22 depending upon whether the parameter has been coded by the VSELP or PSI-CELP method, and supplied to an LPC (linear predictive coding) synthesis circuit 19.

Also, a linear prediction factor $\alpha_N$ being a second coded parameter included in the coded parameters is supplied from an input terminal 11 to an $\alpha_N/r_N$ (linear prediction factor/auto-correlation) conversion circuit 15.

Further, the voice frequency band spreader comprises a wide-band code book ($r_w$ CB) 17 previously generated using auto-correlation parameters extracted from wide-band voices. The wide-band code book 17 is used to widen an auto-correlation r by an auto-correlation widening circuit 16 to provide a wide-band auto-correlation $r_w$, convert it to a wide-band linear prediction factor $\alpha_w$ again by an $r_w/\alpha_w$ conversion circuit 18, and supply it to the LPC synthesis circuit 19. The LPC synthesis circuit 19 synthesizes a wide-band voice based on the wide-band linear prediction factor $\alpha_w$ from the $r_w/\alpha_w$ conversion circuit 18 and an extended excitation source from the switch 22.

The voice frequency band spreader further comprises an up-sampling circuit 26 to up-sample, from 8 to 16 kHz, the sampling frequency of a narrow-band voice signal (decoded voice) having been decoded by the voice decoder provided upstream of the voice frequency band spreader and supplied from the input terminal 10, a high frequency (HF) extraction and suppression filter 23 to extract a signal component of higher than 3,400 Hz by removing from the synthesis output of the LPC synthesis circuit 19 a signal component of a narrow-band input voice signal and which has a voice frequency band ranging from 300 to 3,400 Hz, and to suppress signal components of higher frequencies as the user likes, a multiplier 24 to multiply an output from the filter 23 by a gain supplied from a terminal 25 and having been controlled by a gain controller, and an adder 27 to add to the output from the filter 23 having been multiplied by the gain in the multiplier 24 the narrow-band voice signal component of the sampling frequency of 16 kHz supplied from the up-sampling circuit 26 and having an original voice frequency within the range of 300 to 3,400 Hz.

There is delivered at an output terminal 28 a digital voice signal having a sampling frequency of 16 kHz and a voice frequency within a range of 300 to 7,000 Hz.

The voice frequency band spreader constructed as having been described in the above functions as will be described below:

In the voice frequency band spreader, a wide-band parameter is estimated from a narrow-band parameter to synthesize a wide-band voice by LPC (linear predictive coding). Thereafter, a low-frequency component of the original voice is replaced with a one derived from the original voice by up-sampling of it to 16 kHz. That is, a high-pass filtering (HPF) is done to keep only a high frequency signal component, a higher frequency portion of the high frequency signal component is suppressed, its gain is controlled, and then it is added to a signal derived from the original voice by up-sampling.

For the estimation of the wide-band parameter, two operations are required. Namely, the linear prediction factor a has to be widened and excitation source has to be increased in bandwidth. For widening the linear prediction factor $\alpha$, a code book has to be generated in advance using auto-correlation r being a parameter convertible to $\alpha$ which is also convertible to r. The auto-correlation r is increased in bandwidth by quantization and dequantization based on the code book.

First, widening of the linear prediction factor $\alpha$ in bandwidth will be described below. Taking it in consideration that $\alpha$ is a filter factor representative of a spectrum envelope, it is converted once to the auto-correlation r being a parameter representative of another spectrum envelope which makes it easy to estimate a high frequency component, widened in bandwidth, and then converted from the wide-band auto-correlation $r_w$ to $\alpha_w$. For the band widening, the vector quantization is used. Namely, the narrow-band auto-correlation $r_n$ should be quantized in vector and a corresponding wide-band auto-correlation $r_w$ be determined from an index of the narrow-band auto-correlation $r_n$.

Since there is established a fixed relation between the narrow- and wide-band correlations as will further be described later, only a code book should be generated from wide-band auto-correlations, whereby the narrow-band auto-correlation can be quantized in vector and dequantized to determine a wide-band auto-correlation.

On the assumption that a narrow-band signal is a one obtained by limiting the bandwidth of a wide-band signal, there exists the following relation (1) between the wide- and narrow-band auto-correlations:

$$\phi(x_n)=\phi(x_w \otimes h)=\phi(x_w) \otimes \phi(h) \qquad (1)$$

where $\phi$ is an auto-correlation, $x_n$ is a narrow-band signal, $x_w$ is a wide-band signal and h is an impulse response of a bandwidth limiting filter.

Further, the following relation (2) is derived from the relation between the auto-correlation and power spectrum:

$$\phi(h)=F^{-1}(|H|^2) \qquad (2)$$

There is provided an additional bandwidth limiting filter having a frequency characteristic equal to the power characteristic of the above bandwidth limiting filter. On the assumption that the impulse response of the additional bandwidth limiting filter is H', the above relation (2) may be expressed as follows:

$$\phi(h)=F^{-1}(|H|^2)=F^{-1}(H')=h' \qquad (3)$$

The additional bandwidth limiting filter has a passband and inhibition band equal to those of the first bandwidth limiting filter, and has an attenuation characteristic being equal to a square of that of the first bandwidth limiting filter. Therefore, the additional filter can be said to be a bandwidth limiting filter. Taking this in consideration, the narrow-band auto-correlation may simply be a result of convolution between the wide-band auto-correlation and impulse response of the bandwidth limiting filter, namely, a result of bandwidth limitation of the wide-band auto-correlation. That is, the following relation (4) is established:

$$\phi(x_n)=\phi(x_w)\otimes h' \qquad (4)$$

Thus, for vector quantization of a narrow-band auto-correlation, a narrow-band vector necessary for the quantization can be calculated by generating only a wide-band code book, and thus it is not necessary to generate a code book from narrow-band auto-correlations in advance.

Further, since each $r_w$ code vector depicts a curve which monotonously decreases or gently increases and decreases, it will not show any large variation even if it is passed through the bandwidth limiting filter having the impulse response H'. So, the narrow-band auto-correlation rn can be quantized based directly on the $r_w$ code book. However, a code vector should be retrieved based on the code book at every other orders of the narrow-band auto-correlations.

The linear prediction factor a can be extended with a higher precision by separating a voice into a voiced sound and an unvoiced one. Therefore, this voice separation is also adopted in the present invention. Thus, there are used two code books, one for voiced sound and the other for unvoiced sound.

Next, excitation source extension will be described below. In the PSI-CELP method, the excitation source in a narrow band is up-sampled by inserting zeros therein in a zero filling circuit 12 to impart an aliasing distortion to the excitation source. The excitation source having this aliasing distortion is used for extension. This method is very simple. However, since the excitation source keeps a power and harmonic structure difference of the original voice, it may be said to have a sufficient quality as an excitation source.

Then, the LPC synthesis circuit 19 synthesizes a voice by LPC (linear predictive coding) based on the linear prediction factor α and wide-band excitation source.

The wide-band LPC-synthesized voice is low in quality, and so it has a low frequency portion thereof replaced with its original voice $Snd_N$ from the codec. To this end, a portion of higher than 4 kHz is extracted from the LPC-synthesized voice while the codec output is up-sampled to a sampling frequency fs of 16 kHz. The portion of higher than 4 kHz and the code output are added together.

At this time, the gain to be multiplied by the high frequency portion in the multiplier 24 is controllable by the gain controller as the user likes. The gain is variable because the liking is different from one user to another. A gain for the high frequency portion is preset depending upon an input by the user, and multiplied with reference to the preset gain.

Before the addition, the high frequency portion is filtered in the high frequency extraction and suppression filter 23 by somewhat suppressing a component of higher than about 6 kHz, to provide a sound easier to hear. By selecting a desired filter factor and processing with a pre-selected filter, it is possible to select a high frequency band as the user likes. The filter can be selected by the user making a corresponding input.

However, since the processing by the filter 23 will not have any influence on the power characteristic of a low frequency portion, it may be done after completion of the addition. Alternatively, it may be done after completion of the addition of a filter factor which will influence the low frequency portion. With the above operations, a wider-band voice is produced.

How to generate a code book used in the voice frequency band spreader will be discussed herebelow:

Code book generation is effected using a well-known GLA (generalized Lloyd algorithm). A wide-band voice is divided into frames each of a predetermined time length, for example, 20 msec. For each of the frames, auto-correlations of up to a predetermined number of orders, for example, primary to sextic, are determined. With the auto-correlation of each frame taken as a training data, a sextic code book is generated. At this time, voiced and unvoiced sounds may be discriminated from each other, and voiced sound auto-correlations and unvoiced sound auto-correlations be collected separately to generate code books. In this case, for extension of the wide-band linear prediction factor α during the voice frequency band spreading, reference is made to the code books corresponding to the respective voiced sounds (V) and unvoiced sounds (UV) discriminated from the voiced ones (V).

The voice frequency band spreader uses wide-band voiced and unvoiced sound code books. Generation of these code books will be described in detail below with reference to FIGS. 3 and 4.

Figure 3:
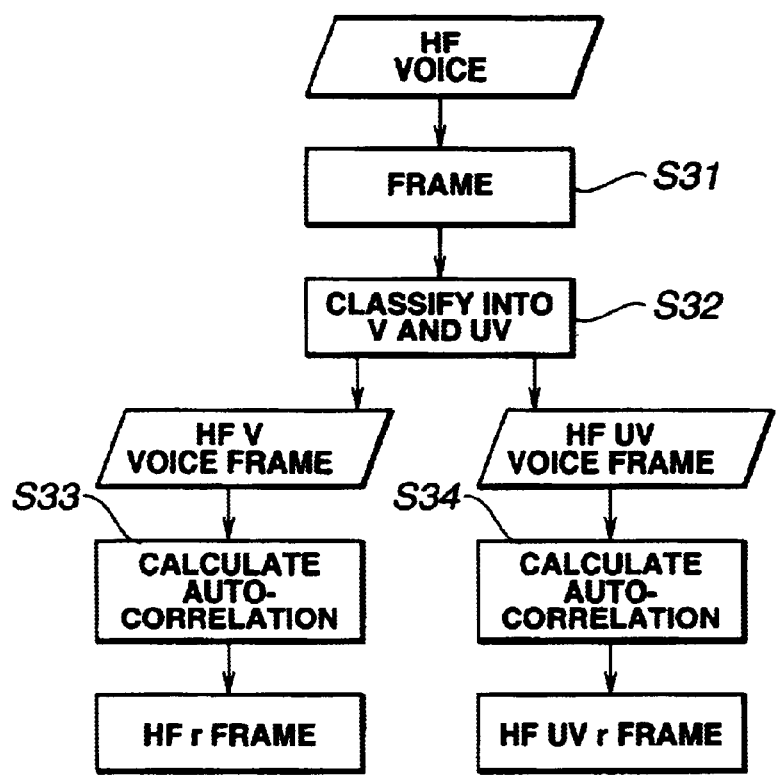
FIG. 3 is a flow chart explaining a process of generating a training data for use in a wide-band voiced sound code book and wide-band unvoiced sound code book used in the voice frequency band spreader.

FIG. 3 is a flow chart explaining a process of generating a training data for use in a wide-band voiced and unvoiced sound code books used in the voice frequency band spreader.

First, a wide-band voiced sound signal is generated for the purpose of learning. It is divided into frames each of 20 msec at step S31. Next at step S32, the voice of each frame is classified to be a voiced sound (V) or unvoiced sound (UV) by examining the frame energy, zero-cross value, etc. for example.

At step S33, primary to sextic auto-correlation parameters r, for example, are calculated for the wide-band voiced sound frame. At step S34, primary to sextic auto-correlation parameters r, for example, are calculated for the wide-band unvoiced sound frame.

Figure 4:
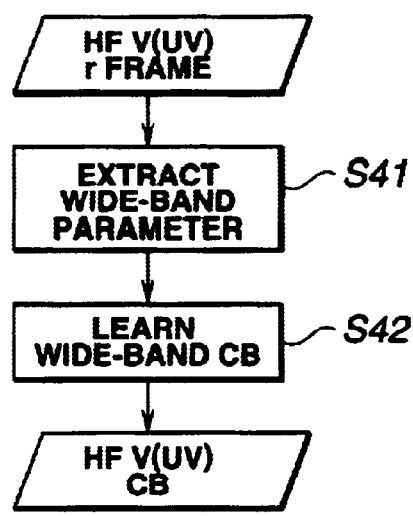
FIG. 4 is a flow chart explaining the generation of the code books.

FIG. 4 is a flow chart explaining the generation of the code books.

At step S41, a wide-band parameter is extracted from the sextic auto-correlation parameter of each frame at step S41, and at step S42, the GLA is used to generate primary to sextic wide-band voiced (V) and unvoiced (UV) code books.

Thus, the voice frequency band spreader adopting the decoding by the PSI-CELP can produce a wide-band voice the user likes by varying the high frequency gain and high frequency suppression filter.

However, an original voice decoded by the VSELP incurs a thick vowel. If the aforementioned method is applied directly to the voice, there will remain a jarring noise in the high frequency portion of the voice. To avoid this, the following is done:

In the PSI-CELP method, the codec itself processes a voice to be acoustically smooth to the ear. However, this cannot be attained by the VSELP method, and so a voice whose bandwidth is widened by the VSELP method will hear as if it had some noise mixed therein. During generation of a wide-band excitation source, the voice is processed by the excitation source selection and extension circuit 20 as in the following:

In the VSELP method, an excitation source is produced to meet the following relation:

$$\beta*bL[i]+\gamma*cl[i]$$

where β is a parameter (long-term prediction factor), bL[i] is a long-term filter status, γ is a gain, and cl[i] is an excitation code vector, all being parameters used in the codec. The former term ($\beta*bL[i]$) of the above expression indicates a pitch component while the latter ($\gamma*cl[i]$) indicates a noise component. When the former has a large energy, the excitation source is considered to be a voiced sound having a strong pitch. So, it is taken as a pulse train and a portion of the excitation source having no pitch component is suppressed to zero. If the former has no large energy, the excitation source is taken as usual. Thus, a narrow-band excitation source is filled with zeros by the zero filling circuit as in the PSI-CELP method and up-sampled to provide a wide-band excitation source. Thereby, the acoustic quality of the voiced sound is improved in the VSELP.

The wide-band excitation source is added by the adder 27 to its original voice $Snd_N$ having been up-sampled by the up-sampling circuit 26. At this time, a high frequency portion can be filtered by the HF extraction and suppression filter 23 which suppresses somewhat a component of about 6 kHz or more to provide a sound easier to hear. The filtering can be done with a selected filter factor.

Further, the adder 24 can be used to control the high frequency gain as the user likes.

When the voice frequency band spreading by the voice frequency band spreader coexists with the echo canceling, it is necessary to provide a coincidence in a microphone input and speaker output.

Figure 5:
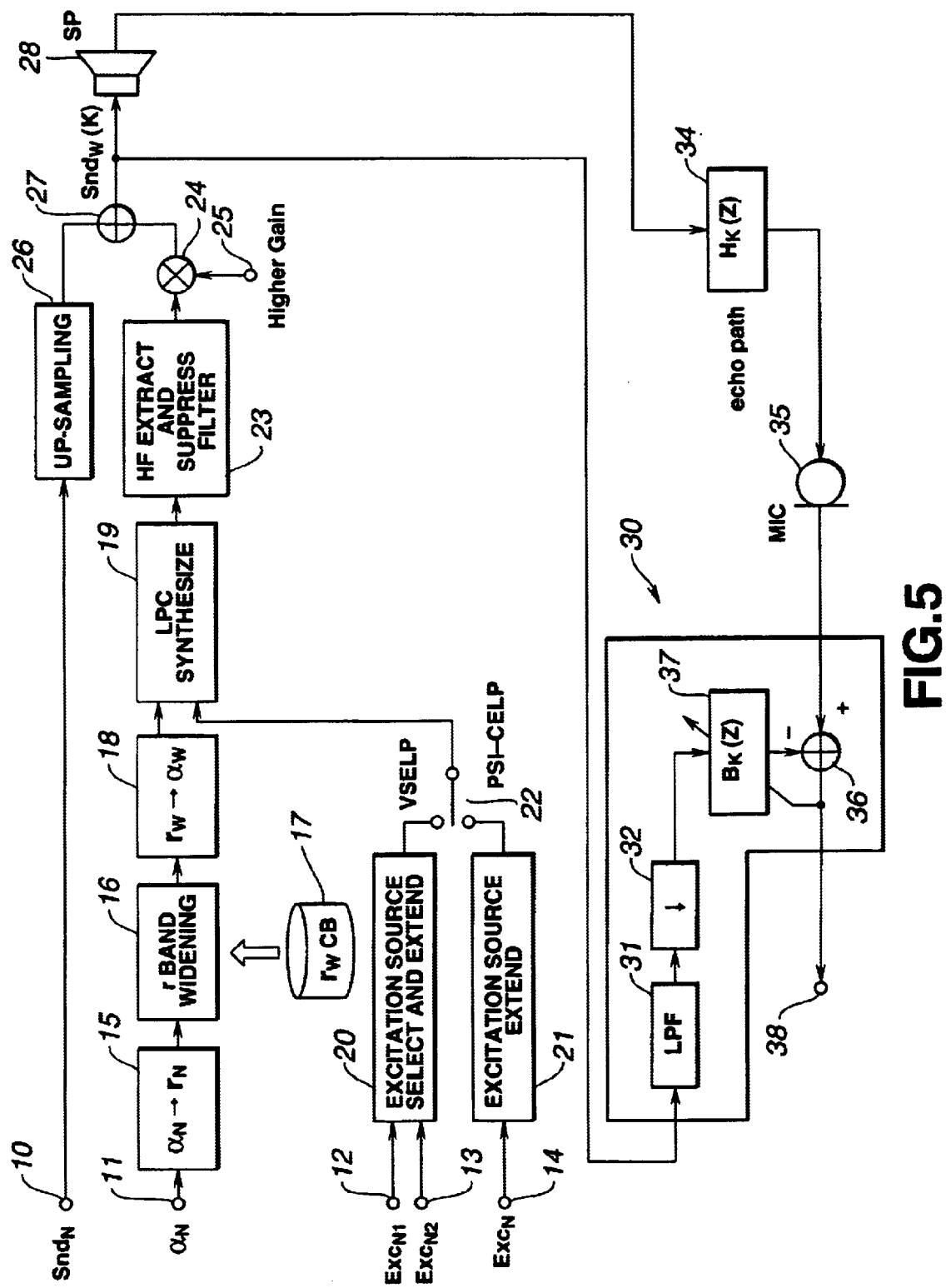
FIG. 5 is a schematic block diagram of a first embodiment of the voice frequency band spreader according to the present invention.

Referring here to FIG. 5, there is illustrated in the form of a schematic block diagram a first embodiment of the voice frequency band spreader adapted, according to the present invention, to down-sample a wide-band voice signal produced as in the above. To suppress aliasing, the wide-band voice signal is limited in frequency band before it is down-sampled. The first embodiment will further be described below with reference to FIG. 5. The voice frequency band spreader is provided with an echo canceller generally indicated with a reference 30 in FIG. 5.

When the voice frequency band spreader converts a narrow-band signal of 8 kHz in sampling frequency to a wide-band signal having a sampling frequency of 16 kHz and the speaker 28 pronounces the wide-band signal, the echo canceller 30 cancels from a microphone input signal coming into the microphone 35 an echo component developed based on the speaker output. The echo canceller 30 comprises a down-sampling circuit 32 to down-sample the sampling frequency of the wide-band signal from 16 kHz to 8 kHz, an adaptive filter 37 to estimate an echo signal coming from the speaker 28 to the microphone 35, and a subtraction circuit 36 to subtract the estimated echo signal from the microphone input signal.

First, the down-sampling circuit 32 converts the sampling frequency of 16 kHz of a wide-band voice signal which is to be outputted from the speaker 28 to the sampling frequency of 8 kHz of a narrow-band voice signal supplied from the input terminal 10.

The adaptive filter 37 can estimate the echo path characteristic of the echo path filter 34. It estimates an echo signal coming from the speaker 28 to the microphone 35 based on the wide-band voice signal whose sampling frequency has been down-sampled to 8 kHz by the down-sampling circuit 32.

The subtraction circuit 36 subtracts from the microphone input signal the echo signal having been estimated by the adaptive filter 37.

Further, the echo canceller 30 is adapted to pass the wide-band voice signal through an LPF (low-pass filter) 31 before supply to the down-sampling circuit 32 in order to suppress aliasing. In the first embodiment of the voice frequency band spreader, however, different from the output of the speaker 28 that should be supplied to the echo canceller 30, the signal of fs=8 kHz resulted from the down-sampling has a problematic phase characteristic as the case may be because it has been influenced by the LPF 31. Therefore, the echo canceller 30 should preferably be used where it is possible to use a filter whose phase characteristic is not problematic.

Figure 6:
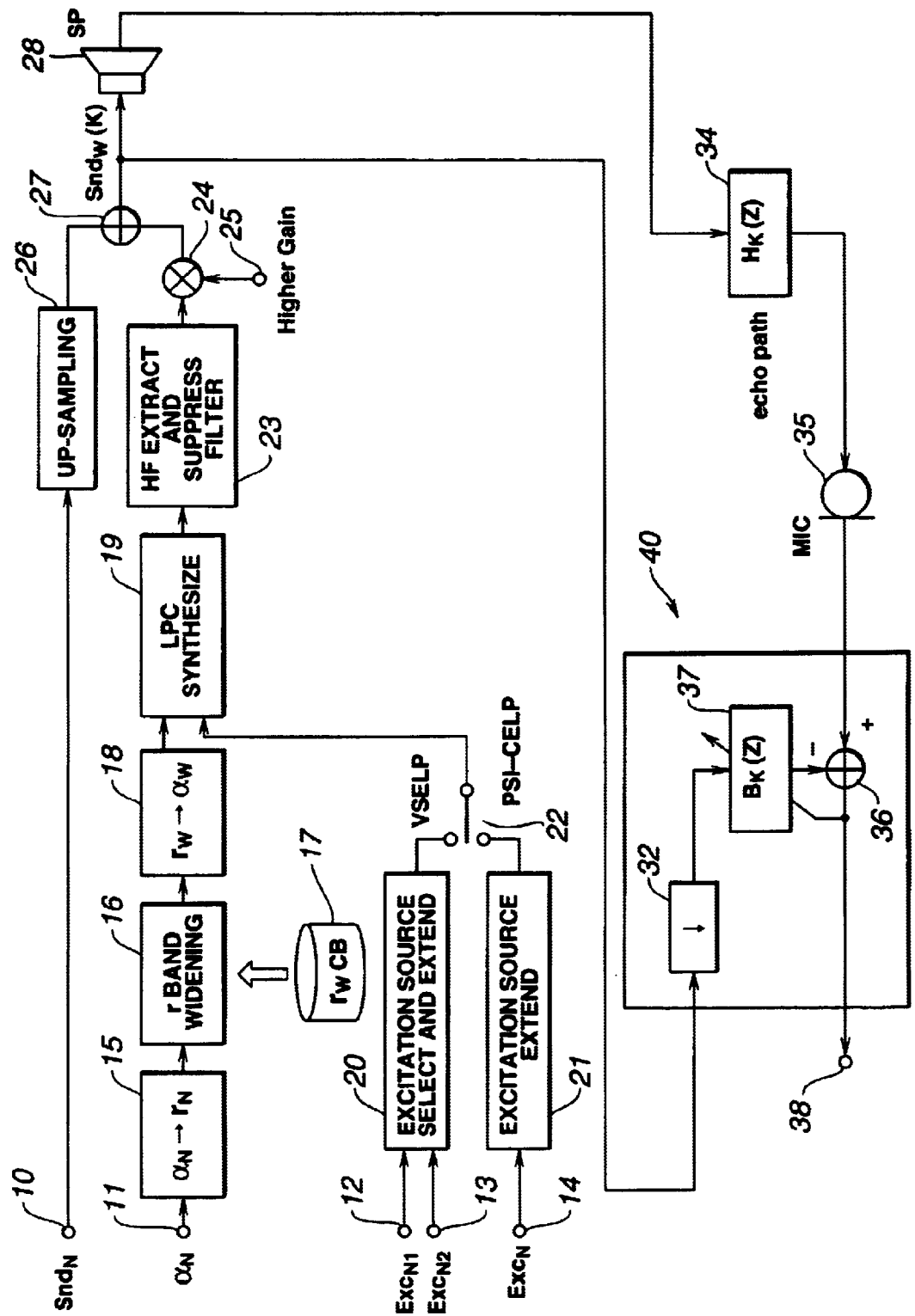
FIG. 6 is a schematic block diagram of a second embodiment of the voice frequency band spreader according to the present invention.

Referring here to FIG. 6, there is schematically illustrated in the form of a block diagram a second embodiment of the voice frequency band spreader according to the present invention, provided with an echo canceller effectively usable when the phase characteristic is problematic or when the computing capacity of the frequency band limiting filter is problematic, to down-sample a wide-band voice signal as it is by decimation. The echo canceller is generally indicated with a reference 40. In the echo canceller 40, the LPF 31 in the echo canceller 30 shown in FIG. 5 is not provided and the down-sampling circuit 32 is used for the decimation. In this case, however, the decimation will cause aliasing. Therefore, because of the echo characteristic and output voice frequency characteristic, the echo canceller 40 should preferably be used when the aliasing is not so great a problem.

Figure 7:
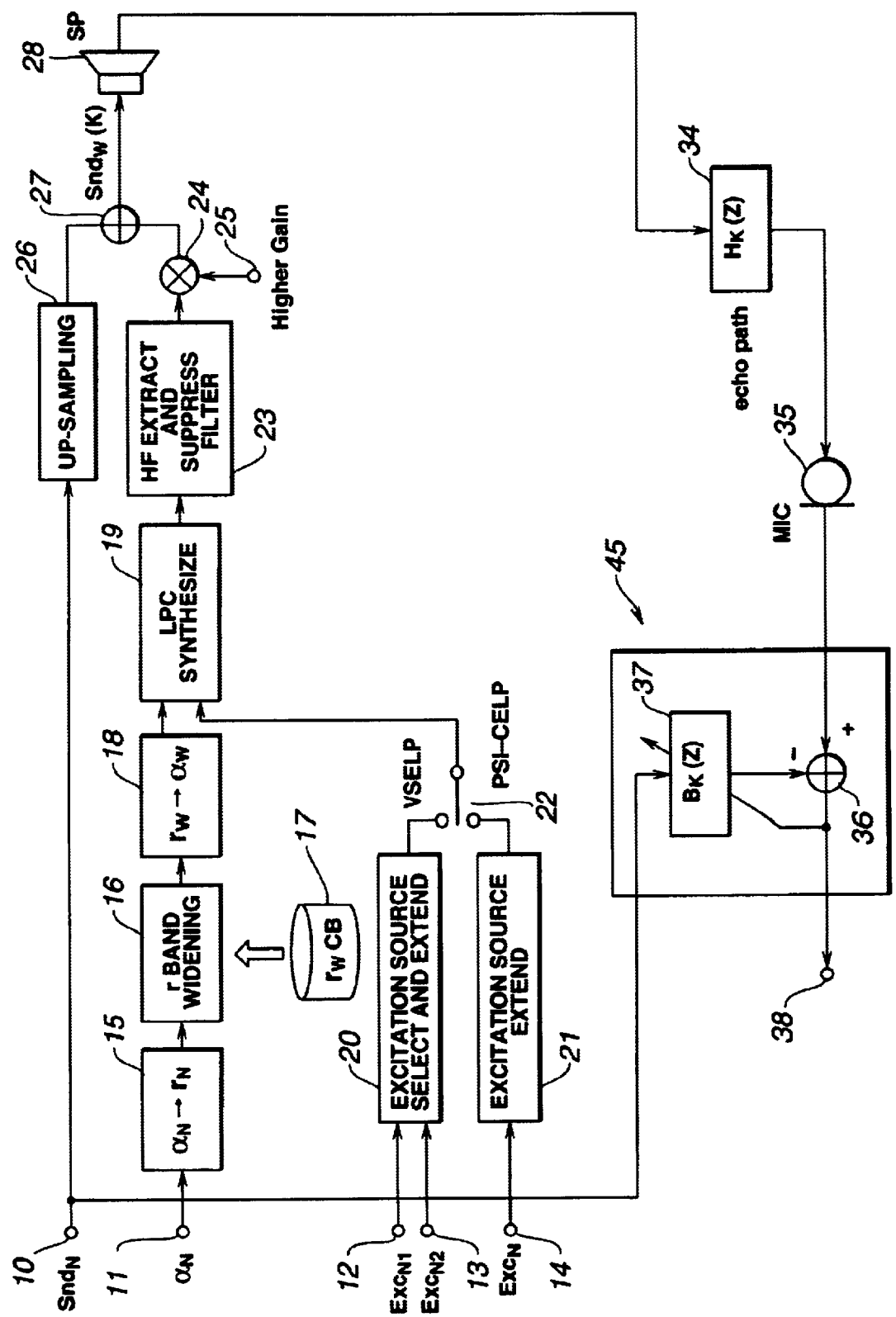
FIG. 7 is a schematic block diagram of a third embodiment of the voice frequency band spreader according to the present invention.

Referring here to FIG. 7, there is illustrated in the form of a schematic block diagram a third embodiment of the voice frequency band spreader adapted, according to the present invention, to store data before a narrow-band voice supplied from the input terminal 10 is up-sampled, and provided with an echo canceller which uses the data. The echo canceller is generally indicated with a reference 45. This embodiment needs a memory to store the data but no calculation for down-sampling. Different from the output of the speaker 28, the signal obtained in this third embodiment is not influenced by the up-sampling and subsequent post-processing. Thus, the echo canceller 45 cancels echoes caused by the existing echo path as well as by signal modifications for the related signal processing. Therefore, the voice frequency band spreader should preferably be used where the influence by the up-sampling and subsequent post-processing will not be problematic.

Figure 8:
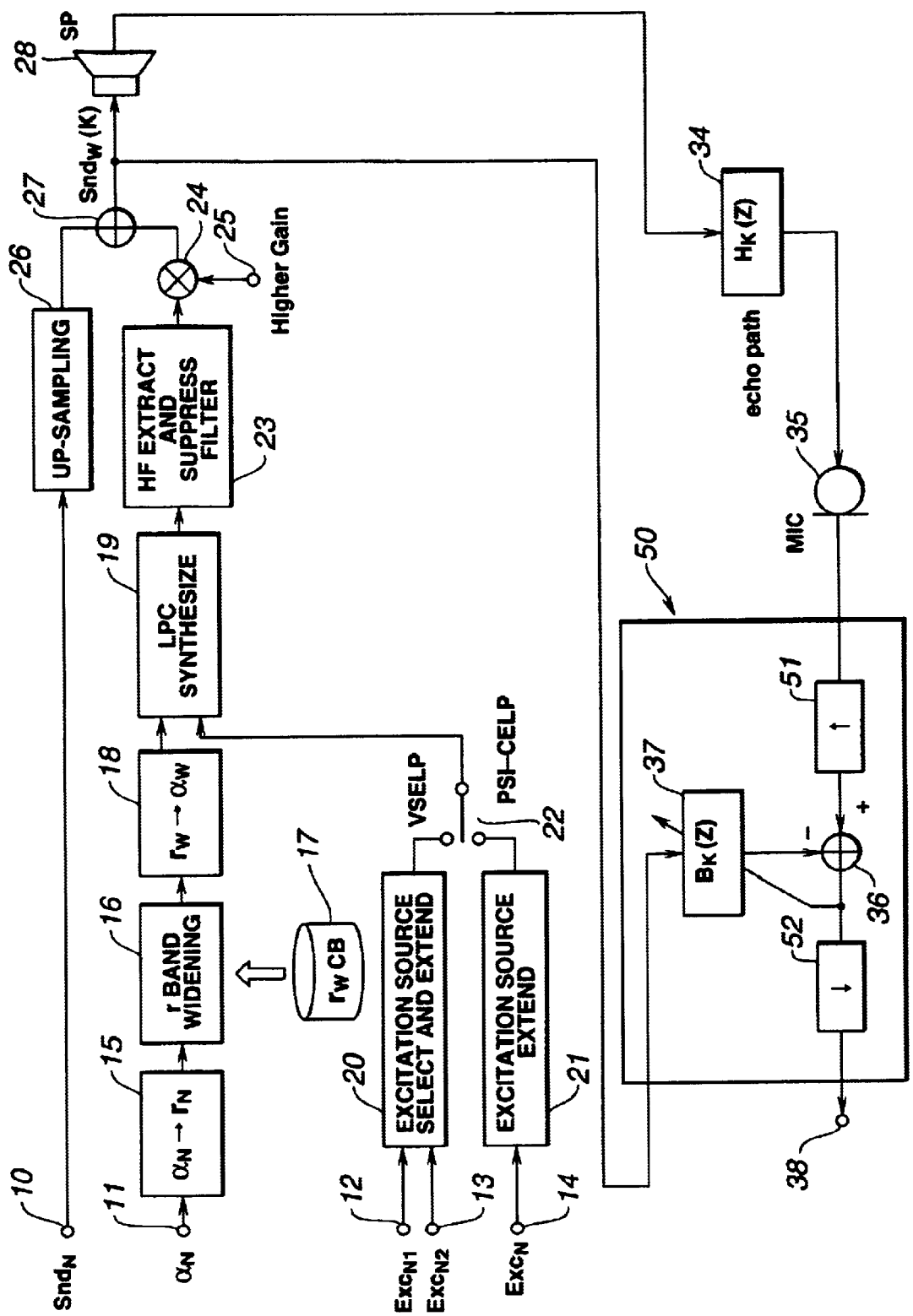
FIG. 8 is a schematic block diagram of a fourth embodiment of the voice frequency band spreader according to the present invention.

Referring here to FIG. 8, there is illustrated in the formation of a schematic block diagram a fourth embodiment of the voice frequency band spreader provided with an echo canceller according to the present invention. The echo canceller is generally indicated with a reference 50. As shown, a microphone input voice to the microphone 35 is up-sampled in sampling frequency by an up-sampling circuit 51 to 16 kHz of a wide-band voice signal. In this embodiment, the echo canceller 50 is adapted to operate with the sampling frequency of an output voice of the voice frequency band spreader. Therefore, it is necessary to cancel an amount of data two times larger than that when the sampling frequency of the wide-band voice signal is down-sampled to 8 kHz, and change the initial B (z) value of the adaptive filter 37 as well. The wide-band voice signal from which the echo component has been canceled is down-sampled to 8 kHz by a down-sampling circuit 52. Note the echo canceller cancels the echo caused by the existing echo path and a signal change due to the up-sampling. Therefore the voice frequency band spreader should preferably be used where the use thereof will be more advantageous even with any influence of the up-sampling than the use of any other method.

As in the above, the voice frequency band spreaders according to the present invention are provided each with an echo canceller to equalize the sampling frequency between the speaker output and microphone input.

Note that in other than the method using the decimation, the ratio in sampling frequency between the speaker output and microphone input is not limited to an integral multiple and that the present invention is not limited to the frequency band spreading technique.

Also, a program prepared based on the aforementioned echo canceling method and which could be executed in a central processing unit (CPU) or digital signal processor (DSP) will make it unnecessary to use any echo canceling hardware.

According to the present invention, the echo canceller can be used to provide a voice whose echo component has been canceled, even when a microphone input and speaker output are different in sampling frequency from each other, and in particular, when one of the sampling frequencies is double the other as in the voice frequency band spreading.

What is claimed is:

1. An echo canceling apparatus for canceling from a microphone output signal having a first sampling frequency an echo component detected by the microphone from a speaker output, the apparatus comprising:

means for converting a sampling frequency of an input voice signal to a second sampling frequency higher than said first sampling frequency and producing a wideband input voice signal fed to the speaker;

means for converting the second sampling frequency of the wideband input voice signal fed to the speaker to the first sampling frequency of the microphone output signal;

means for estimating an echo signal passing from the speaker to the microphone based on the converted wideband input voice signal from the means for converting the sampling frequency of the input voice signal; and means for subtracting from the microphone output signal the echo signal having been estimated by the means for estimating.

2. The apparatus as set forth in claim 1, further comprising:
   means for limiting a frequency band of the wideband input voice signal fed to the speaker to within a frequency band of the microphone output signal.

3. The apparatus as set forth in claim 1, wherein when the first sampling frequency of the microphone output signal is 1/n (n is an integer) of the second sampling frequency of the wideband input voice signal fed to the speaker, the means for converting the second sampling frequency decimates the wideband voice signal by 1/n.

4. An echo canceling apparatus adapted to cancel, from a microphone output signal of a first sampling frequency, an echo component detected by the microphone from a speaker output produced from a voice signal of a second sampling frequency fed to the speaker, the apparatus comprising:
   first means for converting the first sampling frequency of the microphone output signal to the second sampling frequency; and
   means for estimating an echo signal passing from the speaker to the microphone based on the voice signal fed to the speaker;
   means for subtracting the echo signal estimated by the means for estimating from the microphone output signal having a sampling frequency converted by the first means for converting; and
   second means for converting a difference signal output from the means for subtracting to a signal of the first sampling frequency.

5. An echo canceling method for canceling from a microphone output signal having a first sampling frequency an echo component detected by the microphone from a speaker output, the echo canceling method comprising the steps of:
   converting a sampling frequency of an input voice signal to a second sampling frequency higher than said first sampling frequency and producing a wideband input voice signal fed to the speaker;
   converting the second sampling frequency of the wideband input voice signal fed to the speaker to the first sampling frequency of the microphone output signal;
   estimating an echo signal passing from the speaker to the microphone based on the converted wideband input voice signal having the first sampling frequency converted in the step of converting; and
   subtracting from the microphone output signal the echo signal having been estimated by the echo estimating means.

6. The method as set forth in claim 5, further comprising the steps of:
   limiting a frequency band of the speaker output voice signal to within a frequency band of the microphone output signal prior to the step of
   converting the second sampling frequency of the wideband input voice signal fed to speaker.

7. The method as set forth in claim 5, wherein when the first sampling frequency of the microphone output signal is 1/n (n is an integer) of the second sampling frequency of the speaker wideband input voice signal, the sampling frequency is converted by decimating the speaker output signal by 1/n.

8. An echo canceling method for canceling from a microphone output signal of a first sampling frequency an echo component detected by the microphone from a speaker output produced from a voice signal of a second sampling frequency fed to the speaker, the method comprising the steps of:
   converting the first sampling frequency of the microphone output signal to the second sampling frequency; and
   estimating an echo signal passing from the speaker to the microphone based on the voice signal fed to the speaker;
   subtracting the echo signal estimated in the step of estimating from the microphone output signal the sampling frequency thereof having been converted in the step of converting; and
   converting a difference signal from the step of subtracting to a signal of the first sampling frequency.

9. A voice reproducing apparatus for converting an input voice signal of a first sampling frequency to speaker input voice signal of a second sampling frequency and for processing an output voice signal of the first sampling frequency from a microphone picked up from the speaker, the apparatus comprising:
   means for converting the second sampling frequency of the output voice signal to the first sampling frequency of the microphone output voice signal;
   means for estimating an echo component passing from the speaker to the microphone based on the input voice signal having the second sampling frequency; and
   means for subtracting from the microphone output voice signal the echo component estimated by the means for estimating.

10. The apparatus as set forth in claim 9, further comprising:
    means for limiting a frequency band of the speaker voice signal to a frequency band of the microphone input voice signal prior to converting the sampling frequency of the speaker input signal.

11. The apparatus as set forth in claim 9, wherein when the first sampling frequency of the microphone input voice signal is 1/n (n is an integer) of the second sampling frequency of the speaker output voice signal, the means for converting decimates the speaker output voice signal by 1/n.

12. The apparatus as set forth in claim 9, adapted to cancel an echo developed in a voice reproducing apparatus adapted to increase the frequency bandwidth of a narrow-band voice signal supplied thereto and thus output a wide-band voice signal, wherein the subtracting means subtracts, from the microphone input voice signal, the estimated echo signal having been estimated by the echo estimating means based on the wide-band voice signal whose sampling frequency has been converted by the sampling frequency converting means.

13. A voice reproducing apparatus for converting an input voice signal of a first sampling frequency to a speaker input voice signal of a second sampling frequency and for processing an output voice signal of the first sampling frequency from a microphone picked up from the speaker, the apparatus comprising:
    means for converting the first sampling frequency of the microphone output voice signal to the second sampling frequency;
    means for estimating an echo component passing from the speaker to the microphone based on the speaker input voice signal; means for subtracting the echo component estimated by the means for estimating from the microphone input voice signal having a sampling frequency converted by the means for converting; and
    means for converting a difference signal output from the means for subtracting to an output voice signal of the first sampling frequency.

* * * * *